US012286832B2

(12) United States Patent
Trudeau et al.

(10) Patent No.: US 12,286,832 B2
(45) Date of Patent: Apr. 29, 2025

(54) WINDOW MOUNTING ASSEMBLIES

(71) Applicant: TruArmor a division of Clear-Armor LLC, Grayslake, IL (US)

(72) Inventors: David Anthony Trudeau, Grayslake, IL (US); Alex Anthony Trudeau, Grayslake, IL (US)

(73) Assignee: TruArmor a divison of Clear-Armor LLC, Grayslake, IL (US)

( * ) Notice: Subject to any disclaimer, the term of this patent is extended or adjusted under 35 U.S.C. 154(b) by 462 days.

(21) Appl. No.: 17/377,807

(22) Filed: Jul. 16, 2021

(65) Prior Publication Data

US 2023/0016273 A1 Jan. 19, 2023

(51) Int. Cl.

| | |
|---|---|
| ***E06B 5/12*** | (2006.01) |
| ***E06B 3/26*** | (2006.01) |
| ***E06B 7/10*** | (2006.01) |

(52) U.S. Cl.

CPC .............. *E06B 5/12* (2013.01); *E06B 3/2605* (2013.01); *E06B 7/10* (2013.01); *E06B 2003/2615* (2013.01)

(58) Field of Classification Search

CPC .......... E06B 5/12; E06B 3/2605; E06B 5/106; E06B 7/02; E06B 7/10; F41H 5/263; F41H 5/013

See application file for complete search history.

(56) References Cited

U.S. PATENT DOCUMENTS

| | | | | | |
|---|---|---|---|---|---|
| 806,105 | A | * | 12/1905 | Burroughs | E06B 7/02 454/212 |
| 1,202,550 | A | * | 10/1916 | MacDowney | E06B 7/10 454/198 |
| 1,836,980 | A | * | 12/1931 | Marty | E06B 1/38 52/771 |
| 2,068,243 | A | * | 1/1937 | McLaughlin, Jr. | E06B 7/10 454/211 |
| 3,930,452 | A | | 1/1976 | Van Laethem et al. | |
| 4,055,031 | A | | 10/1977 | Okawa et al. | |
| 4,336,644 | A | | 1/1982 | Medlin | |
| 4,331,359 | A | | 5/1982 | Sheldon | |
| 4,525,966 | A | * | 7/1985 | Litchfield | E06B 3/5821 52/204.591 |
| 4,561,223 | A | * | 12/1985 | Gold | E06B 3/28 49/478.1 |
| 4,952,459 | A | | 8/1990 | Thatcher | |

(Continued)

FOREIGN PATENT DOCUMENTS

| | | | | | |
|---|---|---|---|---|---|
| BE | 903160 | A | * | 12/1985 | E06B 3/2605 |
| CH | 175860 | A | * | 3/1935 | |

(Continued)

OTHER PUBLICATIONS

"OneWay Bullet Resistant Glass", Regev Maimon, www.youtube.com, Jul. 21, 2009 (Year: 2009).

(Continued)

*Primary Examiner* — Adriana Figueroa

(74) *Attorney, Agent, or Firm* — Boyle Fredrickson, S.C.; Kirk L. Deheck

(57) ABSTRACT

A security window mounting frame assembly, system, and method of installing building security windows configured to control passage of a compression wave and temperature gradients around a security window pane.

19 Claims, 4 Drawing Sheets

(56) References Cited

U.S. PATENT DOCUMENTS

| | | | | |
|---|---|---|---|---|
| 5,179,804 | A * | 1/1993 | Young | E06B 1/70 49/470 |
| 5,271,311 | A | 12/1993 | Madden | |
| 5,368,904 | A | 11/1994 | Stephinson | |
| 5,567,529 | A | 10/1996 | Smith | |
| 5,584,760 | A * | 12/1996 | Green | F24F 13/18 454/213 |
| 5,594,193 | A | 1/1997 | Sheridan | |
| 5,746,032 | A * | 5/1998 | Koike | E06B 1/702 49/504 |
| 5,747,159 | A | 5/1998 | Labock | |
| 5,789,327 | A | 8/1998 | Rousseau | |
| 5,811,719 | A | 9/1998 | Madden, Jr. | |
| 5,857,730 | A | 1/1999 | Korapi et al. | |
| 5,908,674 | A | 1/1999 | Schindler et al. | |
| 6,027,158 | A | 2/2000 | Yang | |
| 6,158,182 | A * | 12/2000 | Biebuyck | E04B 2/96 52/235 |
| 6,212,840 | B1 * | 4/2001 | Davidovitz | E04H 9/10 52/506.01 |
| 6,280,826 | B1 | 8/2001 | Woll et al. | |
| 6,327,954 | B1 | 12/2001 | Medlin | |
| 6,333,085 | B1 | 12/2001 | Emek | |
| 6,357,186 | B1 * | 3/2002 | Gould | E06B 7/10 52/209 |
| 6,509,071 | B1 | 1/2003 | Emek | |
| 6,546,692 | B1 | 4/2003 | Duncan et al. | |
| 6,818,268 | B2 | 11/2004 | Gonzalez | |
| 7,063,374 | B1 | 6/2006 | Cameron | |
| 7,114,760 | B2 | 10/2006 | Cameron | |
| 7,232,181 | B2 | 6/2007 | Schmucker | |
| 7,318,956 | B2 | 1/2008 | Labock | |
| 7,854,466 | B2 | 12/2010 | Blackmer et al. | |
| 8,088,462 | B1 | 1/2012 | Cockman et al. | |
| 8,281,550 | B1 | 10/2012 | Bolton et al. | |
| 8,844,219 | B2 * | 9/2014 | Neal | E06B 5/106 52/214 |
| 8,863,440 | B1 * | 10/2014 | Champlin | E05G 1/026 52/204.53 |
| 9,091,510 | B2 | 7/2015 | Carberry et al. | |
| 9,500,445 | B2 | 11/2016 | Hsieh et al. | |
| 9,651,340 | B1 | 5/2017 | Tunis, III et al. | |
| 9,657,513 | B1 * | 5/2017 | Kapiloff | F41H 5/0407 |
| 9,982,969 | B2 | 5/2018 | Klingman et al. | |
| 10,006,744 | B2 | 6/2018 | Wibby | |
| 10,267,086 | B2 * | 4/2019 | Vander Bent | E06B 5/103 |
| 10,352,660 | B2 | 7/2019 | Trott | |
| 2003/0209332 | A1 * | 11/2003 | Salzer | E06B 1/6015 160/19 |
| 2005/0072076 | A1 * | 4/2005 | Fulton | E06B 3/677 52/302.1 |
| 2008/0063819 | A1 | 3/2008 | Monroe et al. | |
| 2008/0086960 | A1 * | 4/2008 | Emek | E06B 5/12 52/745.18 |
| 2008/0129084 | A1 | 6/2008 | Blackmer et al. | |
| 2009/0139091 | A1 | 6/2009 | Tucker et al. | |
| 2009/0263651 | A1 | 10/2009 | Cook | |
| 2011/0072961 | A1 | 3/2011 | Jungkuist et al. | |
| 2011/0120032 | A1 * | 5/2011 | Kernander | F41H 5/263 52/203 |
| 2011/0308381 | A1 | 12/2011 | Hartley | |
| 2012/0180638 | A1 | 7/2012 | Hubert | |
| 2012/0207966 | A1 | 8/2012 | Dickson | |
| 2013/0171398 | A1 | 7/2013 | Stranner | |
| 2014/0260937 | A1 | 9/2014 | Whitaker | |
| 2014/0326126 | A1 | 11/2014 | Hay, III et al. | |
| 2015/0260483 | A1 | 9/2015 | Wibby et al. | |
| 2015/0285595 | A1 | 10/2015 | Auchter-Krummel et al. | |
| 2016/0187107 | A1 | 6/2016 | Johnston et al. | |
| 2018/0087877 | A1 | 3/2018 | Carton | |
| 2021/0108668 | A1 * | 4/2021 | Nill | F16B 35/06 |
| 2021/0238911 | A1 * | 8/2021 | Theriault | E06B 3/2605 |
| 2022/0145692 | A1 * | 5/2022 | Franson | E06B 5/11 |
| 2022/0162902 | A1 * | 5/2022 | Snader | E06B 1/36 |

FOREIGN PATENT DOCUMENTS

| | | | | | |
|---|---|---|---|---|---|
| CN | 2247098 | | | 2/1997 | |
| DE | 965164 | C | * | 6/1957 | |
| DE | 10002449 | | | 8/2001 | |
| DE | 10220832 | C1 | * | 8/2003 | E06B 1/6084 |
| DE | 202007007113 | U1 | * | 9/2007 | E04B 2/96 |
| DE | 202010017925 | U1 | * | 5/2013 | F41H 5/263 |
| DE | 102020004076 | A1 | * | 1/2022 | |
| EP | 1004740 | A2 | * | 5/2000 | E06B 3/308 |
| EP | 1645714 | A1 | * | 4/2006 | E06B 5/12 |
| GB | 743379 | A | * | 1/1956 | |
| GB | 1237280 | A | * | 6/1971 | |
| GB | 2159937 | A | * | 12/1985 | E06B 7/10 |
| GB | 2201183 | A | * | 8/1988 | E04B 2/96 |
| GB | 2277348 | A | * | 10/1994 | E06B 5/12 |
| GB | 2301878 | A | * | 12/1996 | E06B 7/10 |
| GB | 2381066 | A | * | 4/2003 | E06B 7/02 |
| KR | 20080001559 | A | * | 1/2008 | |
| KR | 100919871 | B1 | * | 9/2009 | |
| KR | 20090124580 | A | * | 12/2009 | |
| KR | 1402203 | B1 | * | 5/2014 | E06B 5/12 |
| KR | 2021037880 | A | * | 4/2021 | E06B 3/2605 |
| WO | WO-2008023158 | A2 | * | 2/2008 | E06B 3/5409 |
| WO | WO-2009155965 | A1 | * | 12/2009 | F41H 7/042 |
| WO | WO-2012153140 | A1 | * | 11/2012 | E06B 5/12 |

OTHER PUBLICATIONS

"One-Way Ballistic Glass", Total Security Solutions, www.tssbulletproof.com, Sep. 26, 2011 (Year: 2011).

"Compressive Strength Testing of Plastics"; http://www.matweb.com/reference/compressivestrength.aspx (Year: 2007).

Bos, Freek; Louter, Christian; Veer, Fred; "Challenging Glass: Conference on Architectural and Structural Applications of Glass; Faculty of Architecture, Delft University of Technology"; May 2008'; ISBN 9781586038663, p. 148 (Year: 2008).

* cited by examiner

WINDOW MOUNTING ASSEMBLIES

BACKGROUND OF THE INVENTION

Penetration resistance is a property that is desired in various environments and in various applications. Examples of such applications include providing structures that can withstand storm debris impacts, impacts associated with detonation of explosive or improvised explosive devices (IED's), such as car bombings or the like, and building security windows, etc. Understandably, the degree and nature of the penetration resistance performance is largely related to the use and construction of the underlying structure as well as the ability of the structure or window mounting arrangement to withstand the weight, forces, temperatures, etc. associated with considerations related to movability and/or the underlying operation of the window and window frame and building structures with which they are supported to provide a desired degree of penetration resistance or ability to withstand the various energies associated with the proximity of the origin of the respective detonated energies and materials accelerated thereby.

With respect to storm proofing applications, others provide window and door assemblies that can be constructed to provide variable degrees of debris or projectile impact resistance. As shown in FIG. 4, many commercial store front environments 400 include one or more windows 402, 404, 406, . . . , x, that are secured to obstruct an opening 408 that is defined by building 410 or ground 412 structures that surround the discrete opening 408. The discrete glass panes defined by the windows 402, . . . , X are commonly surrounded by respective framing structures 414 that surround the panes of storm glass and are constructed to secure the frame structures to adjacent building structures such jamb members associated with the vertical edges of the windows, a sill associated with the bottom of the windows, and a header associated with the top of the windows. Unfortunately, such approaches are not without their respective drawbacks. For instance, storm proofing existing structures and/or the glass panel assemblies associated with windows and doors common thereto generally requires replacement of the entire framed or jambed window and door units as a whole. Such an approach requires consideration of building codes and building aesthetics so as to maintain an unobtrusive presentation of the penetration resistant structures. Such an approach substantially increases new building construction, tends to reduce area associated with the see-through structures of the windows and doors, and is generally cost prohibitive from a remodeling perspective.

Still further, with respect to configuring existing structures to provide penetration resistance, the existing underlying structures associated with supporting the respective doors and windows are commonly ill-suited to withstand the additional loading associated with replacement of such structures. That is, storm proof windows and doors are generally substantially heavier than traditional window and door frame assemblies such that the underlying building framing must be designed and constructed to support the loading that the transparent window structures are intended to withstand. Such considerations are more problematic in multi-floored structures and/or structures having floor-to-ceiling window and/or door panels wherein the underlying structural framing is ill-suited to withstand the addition forces associated with penetration resistant window and door panels and the weight and forces customary thereto. Accordingly, a first aspect of the present invention is directed to providing glass panel structures that exhibit improved penetration resistance or panel failure to existing window and/or door structures and particularly, the transparent portions thereof.

Still further, although many such storm proofing applications provide improved security of the building envelope when subjected to prolonged durations of increased wind and water events, such approaches are commonly ill-suited to withstand the energy or percussive wave and temperature conditions attenuate to proximate detonation of munitions or otherwise improvised explosive devices and/or repeated impacts due to the nefarious activities such as riots or the like. That is, although many storm proofing window assemblies are capable of withstanding the compressive loadings associated storm events such as hurricanes, typhoons, or the like, many approaches associated with the improving the ability of window assemblies to withstand storm loading are incapable of withstanding the faster propagating and higher temperatures associated with wartime and/or nefarious detonations effectuated in close proximity to the window assemblies. Commonly, storm or hurricane window assemblies fail to maintain the desired separation between the surrounding atmosphere and the volume of the building envelope due to the increased temperature loading relative to the opposing lateral sides of the window assembly. That is, the quickly elevated temperature of the exterior facing surface of the window assembly relative to the decreased temperature of the interior facing surface of the window assembly, commonly associated with a condition environment, tends to impart separation between the discrete layers of the storm window assemblies and failure to provide the desired isolation between the respective environments.

Further still, were the respective window assemblies provided in a construction methodology sufficient to withstand the storm event, the mounting arrangements associated with such window assemblies are commonly constructed to withstand loads only as great as the relative storm related loading of the window assemblies. Exposure of the window assemblies to loads greater than those customary to storm events can result in premature failure of the window mounting methodologies employed to secure the respective storm windows to the surrounding structure of the building envelope. Still further, actions by nefarious actors such as rioters or looters, becoming aware of the ability of storm windows to withstand repeated impacts without failure of the glass panel construction, tend to attack window frame assemblies with the expectation of faster penetration and/or remove of the transparent panels or portions thereof sufficient to allow unauthorized access and egress from target environments.

Therefore, a need exists for building window assembly wherein the transparent window panels provide improved structural integrity and securing methodologies wherein greater efforts or impact energies are required to effectuate failure of the pane of transparent material and/or related mounting assemblies that are constructed to be of a weight and construction sufficient for cooperation with customary building mounting arrangements and that are better equipped to withstand forced, temperature related, or blast removal or penetration of the window and associated frame assemblies from the building structures to a degree sufficient to mitigate undesired access to the building environment and in a manner that does not unduly interfering with customary building construction practices.

SUMMARY OF THE INVENTION

The present invention relates to transparent window and window mounting assemblies that overcome one or more of the shortcomings disclosed above. The security window mounting frame assembly, system, and method of installing building security windows that are constructed to provide controlled passage of temperature waves and/or compression waves around a security window pane and to the opposing sides thereof so as to increase the resistance to penetration of the opening that is shaped to receive the window and window mounting assembly.

One aspect of the application discloses a window support assembly that includes a window support frame that is constructed to be disposed about at least a portion of perimeter of an impact resistant transparent window assembly. The window support frame includes a support portion that extends across at least a portion of a thickness of the impact resistant transparent window assembly and a flange that extends radially inboard from the support portion to overlie a portion of a radial edge of the impact resistant transparent window assembly. A first opening and a second opening are formed through the support portion of the window support frame and each provide a respective passage through the window support frame at respective locations that are radially outboard of a footprint of the impact resistant transparent window assembly and wherein the first opening and the second opening are disposed about the impact resistant transparent window assembly and vertically offset from one another.

Another aspect of the present application that is usable or combinable with one or more of the above features or aspects discloses a security window assembly that includes a frame that is constructed to extend along at least a portion of an opening defined by a building structure. The frame includes a riser that is oriented to be disposed in a plane of a security window and located radially outboard of the security window. A reinforcement flange extends along a portion of at least one side of the security window and a mounting flange extends in a lateral direction from the riser and is constructed to secure the frame to the building structure. A first opening is formed through the riser and defines a passage that fluidly connects opposing sides of the security window at a location radially outboard of a perimeter of the security window and a second opening is formed through the riser that defines another passage that fluidly connects opposing sides of the security window at a location radially outboard of the perimeter of the security window and which is vertically offset from the passage defined by the first opening.

A further aspect of the present application that is usable or combinable with one or more of the above features or aspects discloses a method of forming a security window assembly. The method includes providing a laminated window pane assembly that is shaped to overlie a building window opening. A frame assembly that is constructed to cooperate with the laminated window pane assembly is provided and is constructed to define a riser that extends between the laminated window pane assembly of the building window opening. A first opening and a second opening are formed through the riser such that each of the first opening and second opening extend to opposing sides of the laminated window pane assembly and the first opening is located nearer a bottom of the laminated window pane assembly than the second opening and the second opening is located nearer a top of the laminated window pane assembly than the first opening.

These and other aspects, features, and objectives of the present invention will be appreciated and understood from the following brief description of the drawings and the detailed description of that which is shown therein.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

DETAILED DESCRIPTION

The present invention and the various features and advantageous details thereof are explained more fully with reference to the non-limiting embodiments described in detail in the following description.

Figure 1:
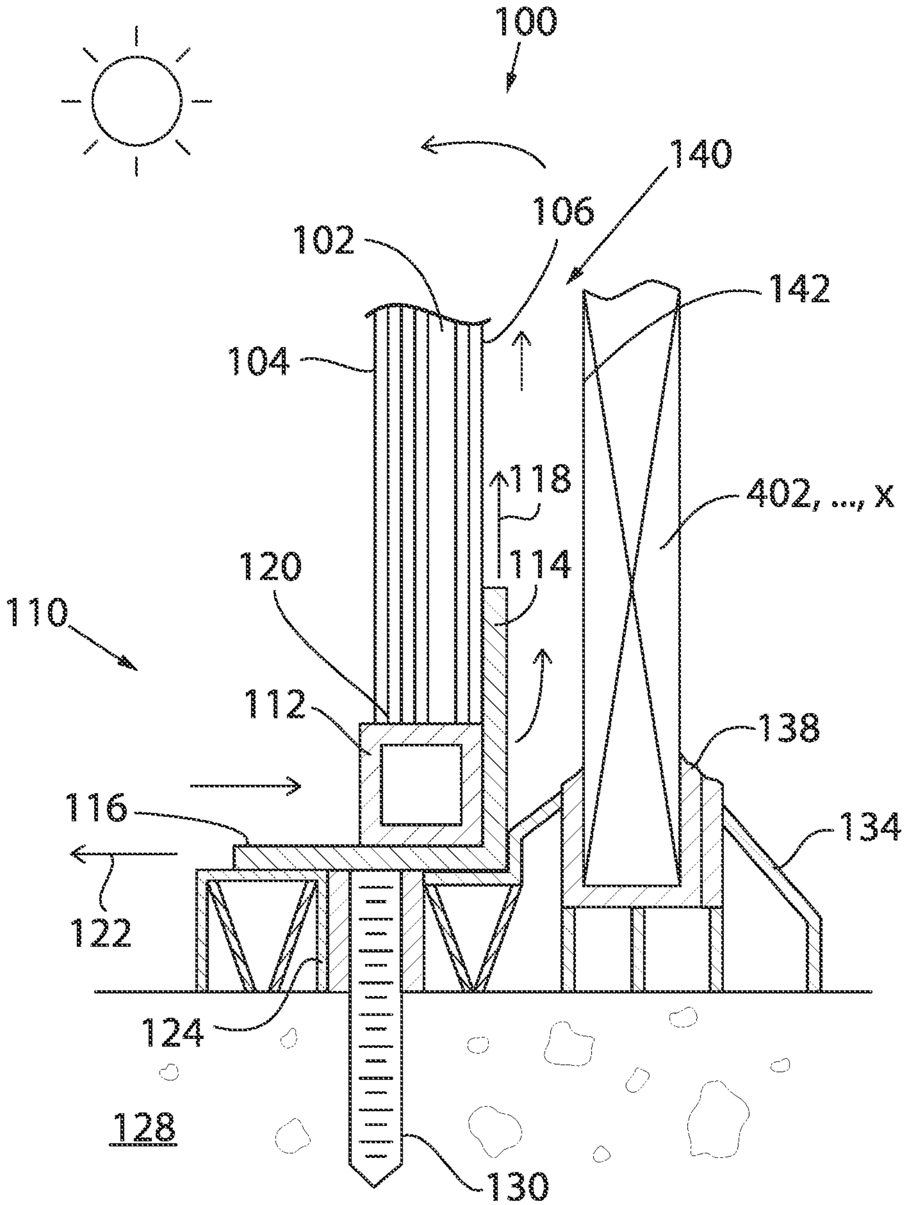
FIG. 1 is a cross section view of a building window assembly equipped with a penetration resistant window and penetration resistant window support or frame assembly mounted to a building opening in accordance with the present invention.

FIG. 1 shows a cross section of a portion of a window and window frame assembly 100 according to the present invention and that is disposed to overlie a less impact or lateral or temperature load tolerant window or storm window assembly such as window assemblies 400, . . . , x disclosed above. Window assembly 100 includes an impact or projectile penetration resistant transparent panel, pane, panel assembly, or pane assembly 102 that defines a first lateral side 104 and the second lateral side 106 thereof of the penetration resistant window assembly 100. Transparent penetration resistant window assembly 102 is preferably constructed in accordance with the disclosure of Applicant's issued U.S. Pat. No. 10,539,399, filed on Nov. 28, 2017, titled "Projectile Penetration Resistance Assemblies" or Applicants currently pending U.S. patent application Ser. No. 17/360,248, filed on Jun. 28, 2021, and titled "Window Assemblies" and the disclosures of which are both incorporated herein. As disclosed therein, impact resistant transparent pane assembly 102 preferably has a laminate construction and is constructed to withstand high velocity projectile impacts, such as bullets or the like, as well as objects or particles accelerated by other means such as explosive devices or improvised explosive devices (IED's) or the like. Although the transparency of the discrete panes may be diminished or blemished when subjected to high energy impacts that are common to storm events, pane 102 is constructed to maintain a degree of integrity sufficient to maintain near continuous segregation between the environments intended to be separated by panes 102. That is, even though discrete layers of pane 102 may be damaged or fractured during an impact event, the laminate construction of pane 102 allows pane 102 to maintain a degree of continuity that mitigates passage of projectiles across the plane defined by a footprint of pane 102.

Window assembly 100 includes a window frame assembly 110 that is constructed to support the transparent projectile penetration resistant pane 102 of window assembly 100 and prevent the translation of pane 102 relative to its fixed position associated with weather resistant panes 402, . . . , X. Window frame assembly 110 includes a support, a support portion, or a riser 112; a reinforcement, flange, or reinforcement flange 114; and a mount or mount plate 116 that are secured to one another. Preferably, riser 112 flange 114, and mount plate 116 are each constructed of steel materials. It is appreciated that riser 112, flange 114, and mount plate 116 could be constructed in an integral or continuous manner or formed of a plurality of more readily commercially available dimensional steel materials that are welded to one another or otherwise fabricated so as to define a desired cross section of frame assembly 110 specific to a given application and/or discrete size defined by a building opening intended to overlay or be obstructed by window assembly 102. That is, it is appreciated that riser 112 could be provided as square or rectilinear steel tube stock and flange 114 and mount plate 116 could be provided as dimensional steel flat stock and/or as a unitary structure in the form of angle steel stock.

Regardless of the manufacturing methodology employed, flange 114 is constructed to extend in an inward radial direction, indicated by arrow 118, relative to the geometric plane defined by transparent panel or pane 102 so as to radially overlap at least a portion of a radial edge 120 or perimeter of transparent impact resistant pane 102. Although flange 114 is shown as extending along one 106 of the respective lateral sides 104, 106 of pane 102 associated with the secondary side associated with a respective direction of impact, it is appreciated that flange 114 could be provided in a generally U-shaped construction so as to extend along both of the opposing sides 104, 106 in a generally mirror configuration. Mount plate 116 extends in a lateral direction, indicated by arrow 122, relative to the plane defined by transparent panel 102 and generally normal to direction 118 of flange 114. As disclosed further below with respect to FIG. 2, mount assembly 110 includes one or more optional posts or support posts 124 that extend in an outward radial direction from mount plate 116 relative to pane 102 and to an adjacent building structure 128 such as a building sill, a header structure, or a jamb structure associated with defining the opening shaped to receive window assembly 100.

One or more fasteners 130 cooperate with mount plate 116, and pass through optional support posts 124 when employed, and securely engage adjacent building structure 128 so as to secure frame assembly 110 relative thereto. Less impact tolerant window assemblies 402, . . . , X are commonly secured to building structures 128 via extruded aluminum assemblies 134 or the like and commonly have one or more gaskets or similar weatherproofing materials 138, such as caulk or the like, associated with providing the weatherproofing seal associated with window assemblies 402, . . . , X relative to the adjacent building structures 128. Optional support posts 124 are constructed to provide both compression and shear load bearing engagement between building structures 128 and mount plate 116 when the aluminum extruded frame members 134 extend across an area associated with securing frame assembly 110 relative to building structures 128.

It should be appreciated that when the extruded aluminum window frame assemblies 134 associated with window assemblies 402, . . . , X are sufficiently narrow or laterally thin enough to allow mounting assembly 100 to directly engage the adjoining building structures 128, support posts 124 can be omitted such that mount plate 116 can be secured directly to building structures 128 via one or more fasteners 130 dispersed about the perimeter of frame assembly 110. When transparent penetration resistant panel 102 is engaged with frame assembly 110, and secured proximate less penetration resistant window assemblies 402, . . . , X, a space or gap 140 is maintained between the respective opposite facing surfaces 106, 142 of the adjacent penetration resistant transparent panel 102 and respective less penetration resistant window assembly 402, . . . , X.

Figure 2:
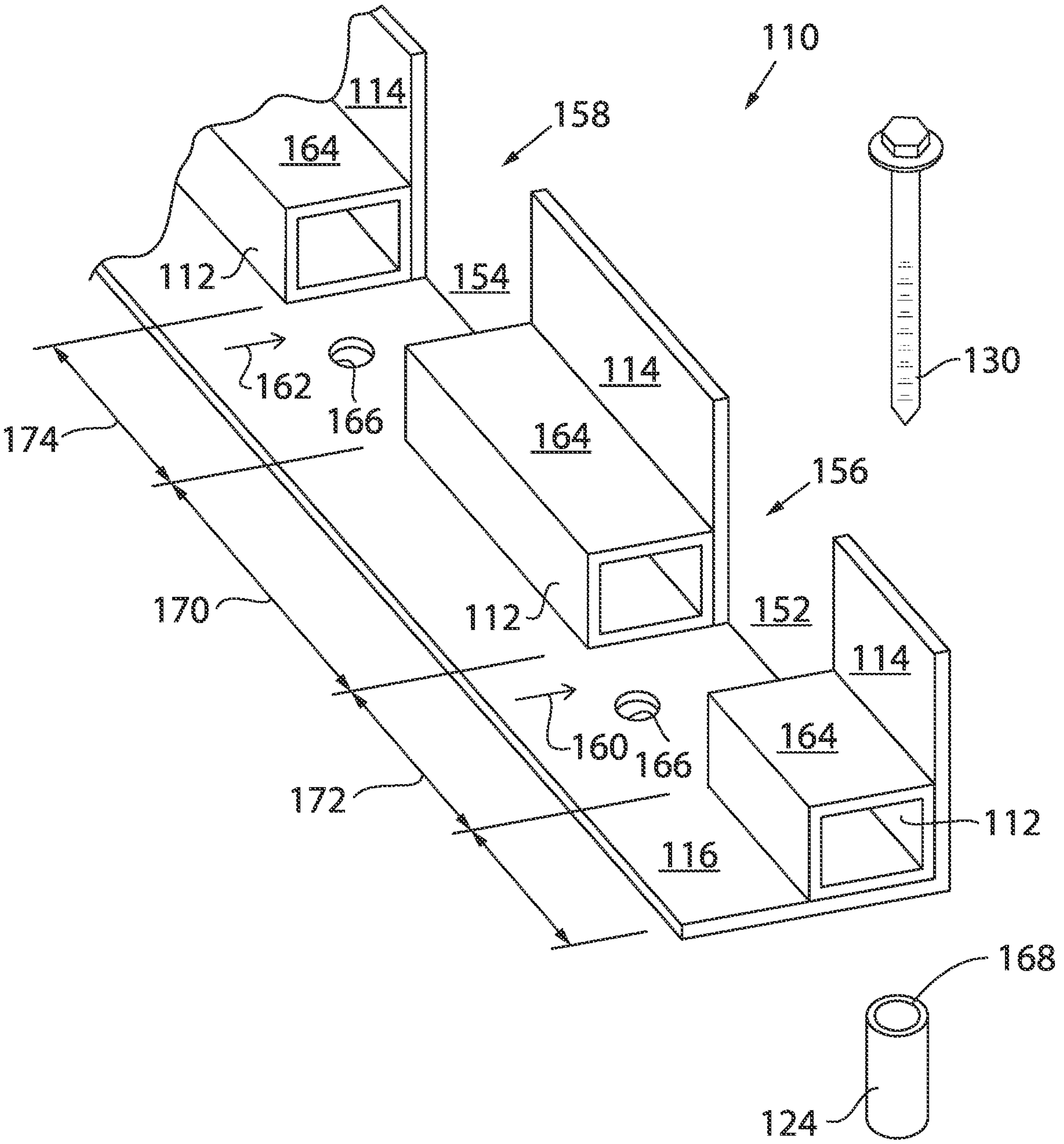
FIG. 2 is a perspective view the penetration resistance window frame assembly shown in FIG. 1 with the penetration resistance transparent window assembly removed therefrom.
Figure 3:
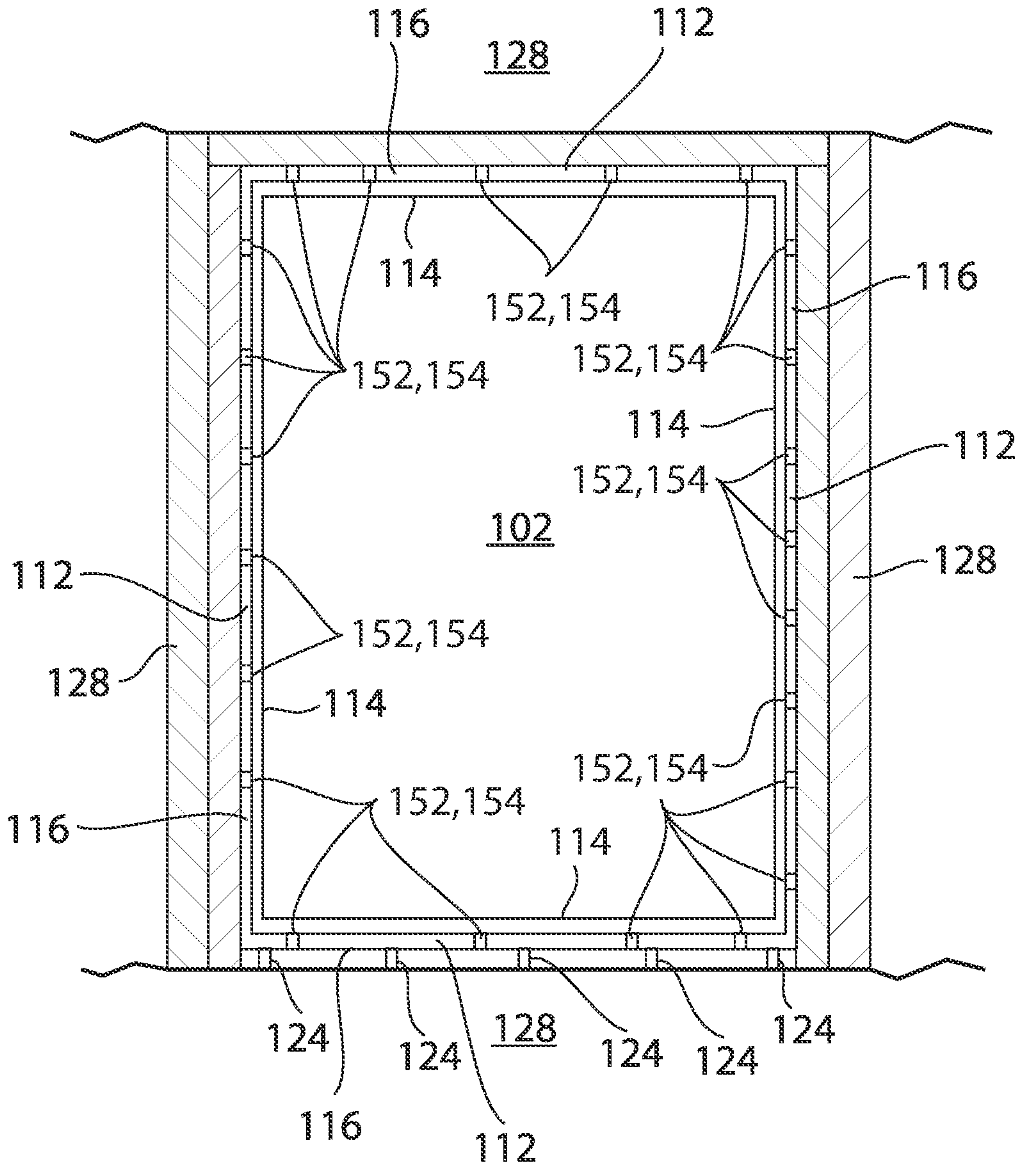
FIG. 3 is an elevational view of a penetration resistant window and window frame assembly secured across an opening defined by a building structure.
Figure 4:
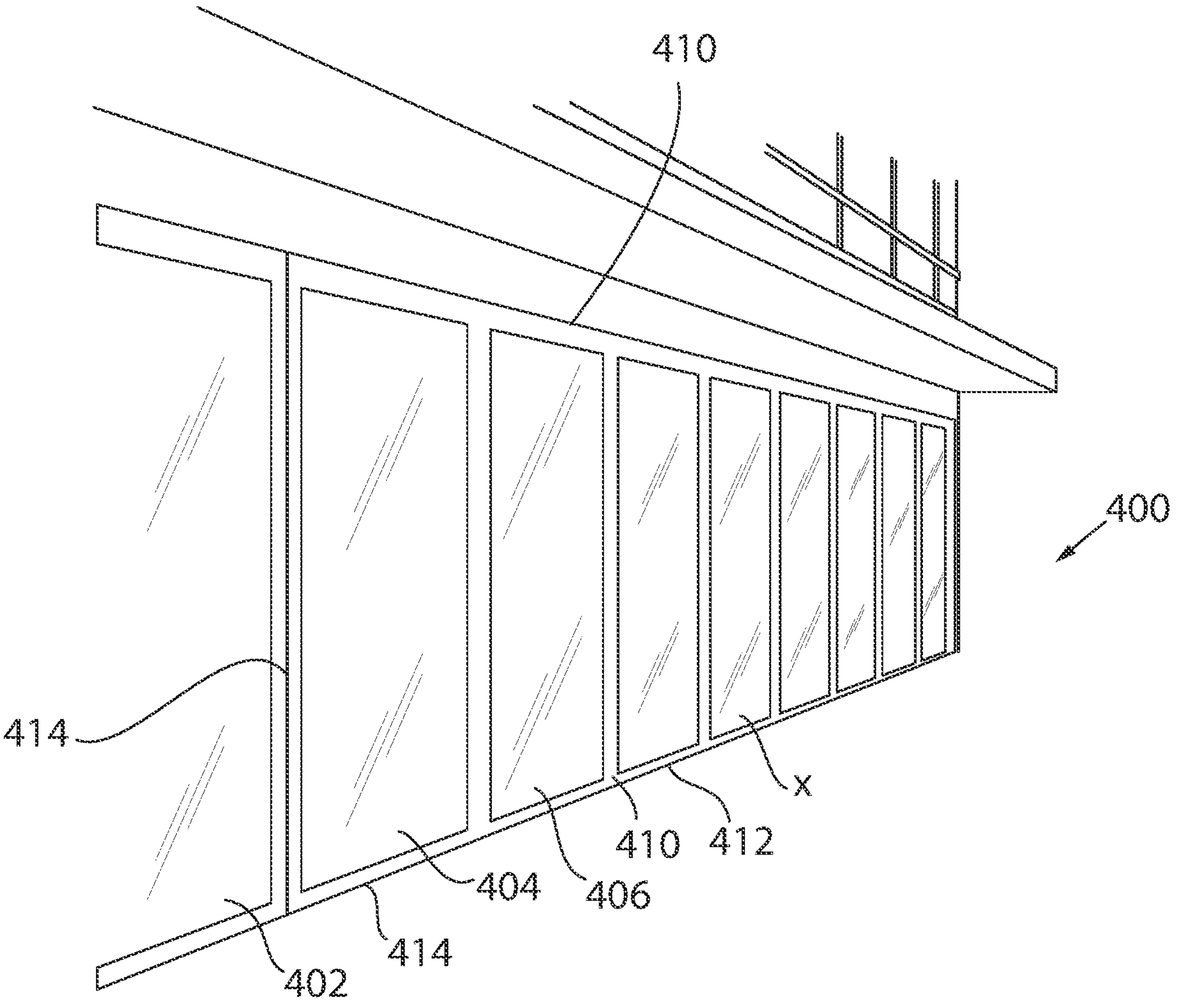
FIG. 4 (PRIOR ART)
FIG. 4 is a perspective view of a building equipped with multiple window assemblies that exhibit limited penetration resistance.

Referring to FIGS. 2 and 3, riser 112 includes one or more gaps or cutouts 152, 154 that are disposed intermittently about the respective frame assemblies 110 that extend about a circumference of a respective transparent projectile resistant panel assembly 102 associated with a respective building window opening. Although flanges 114 are shown as having a corresponding cutout or openings 156, 158 that are generally aligned with respective cutouts 152, 154 associated with riser 112, it is appreciated that flanges 114 may be provided in a continuous manner between the opposing ends of the discrete window frame assemblies 110 disposed about a perimeter of a discrete impact resistant transparent panel assembly 102.

Cutouts 152, 154 associated with riser 112 define respective passages 160, 162 that extend laterally through mount assembly 110 or in a crossing direction relative to the geometric plane defined by transparent panel 102. That is, a radially inward directed surface 164 of the discrete portions of riser 112 are constructed and oriented to engage the radial edge 120 of projection resistant transparent panel 102 and are periodically interrupted by the discrete cutouts 152, 154. Fasteners 130 cooperate with respective openings 166 defined by mount plate 116 and cooperate with an opening 168 associated with discrete optional support posts 124, when employed, and directly engage structure 128. It should be appreciated that fasteners 130 could be provided in numerous modalities and/or constructions so as to pass at least partially through and/or be seated within riser 112 and or mount plate 116.

As shown in FIG. 2, although other locations are envisioned, discrete fasteners 130 are preferably oriented to be aligned with cutouts 152, 154 so as to facilitate the more convenient installation and user interaction during placement of frame 110 during mounting thereof. Referring to FIGS. 2 and 3, a plurality of mounting assemblies 110 are disposed radially about the perimeter of transparent penetration resistant pane 102 and secured thereto such that riser 164 and reinforcement flange 114 of each mounting assembly 110 plane out along the respective outward radial perimeter of penetration resistant transparent panel 102 and a respective lateral side 104, 106 thereof, respectively, when the pane 102 is associated therewith. When disposed in a vertical orientation, it should be appreciated that openings 152, 154 are disposed at discrete elevations relative to the vertical length associated with penetration resistant panel 102. Said another way, the discrete openings or cutouts 152, 154, when vertically oriented, are vertically offset from one another. It should be further appreciated that a respective amounting assembly 110 secured to a sill associated with building structure 128 and having one or more cutouts 152, 154, provides at least one cutout 152, 154 that is disposed lower than one or more cutouts 152, 154 associated with another mounting assembly 110 that is disposed along a respective side of the penetration resistant transparent panel 102 and/or respective cutouts 152, 154 associated with a top edge or head mounting portion associated with panel 102.

Cutouts 152, 154 associated with the plurality of mounting assemblies 110 disposed about the perimeter of pane 102 are preferably disposed in a spaced relationship relative to one another about the radial perimeter thereof. Adjacent openings or cutouts 152, 154 are preferably no nearer than approximately 4 inches apart from one another, and are preferably, as indicated by dimension 170, approximately 10 inches from one another. Preferably, cutouts 152, 154 are no greater than 10 inches from the adjacent facing edges of one another and have a running length of approximately 2 to 4 inches, as indicated by dimensions 172, 174. It is appreciated that discrete cutouts 152, 154 could be provided at alternate or different dimensions than those provided above and relative to others of the plurality of surrounding cutouts 152, 154.

In a preferred aspect, approximately 20% of the linear distance associated with the perimeter circumference of penetration resistant transparent pane 102 is defined by the sum of distances 172, 174 associated with the cutouts 152, 154 disposed about the perimeter of pane 102. The spacing and radial distribution of cutouts 152, 154 about the radially directed outward edge of panel 102 allows a portion of any compressive and thermal energy directed toward pane 102 to pass therearound via frame assembly 110 in a controlled manner and operate to reduce a difference between the pressures and thermal loadings associated with the opposing sides 104, 106 of panel 102 during an explosive or fire event. Such considerations mitigate degradation or destruction of pane 102 due to disparate temperature and pressure differences between the discrete opposing lateral sides of pane 102 thereby improving the ability of pane 102 and the corresponding frame assembly 110 to withstand greater non-point loaded penetration failures.

In order to secure a building envelope or a discrete portion thereof, a laminated security window pane assembly that is shaped to overlie a building window opening is provided. A frame assembly is constructed to cooperate with the laminated security window pane assembly and is constructed to define a riser that extends in a radial direction between the laminated window pane assembly and the opening defined by the building structure. A first opening and a second opening are formed through the riser such that each of the first opening and second opening extend unobstructed to opposing sides of the laminated window pane assembly such that, when secured relative to the building opening, the first opening is located nearer a bottom of the laminated window pane assembly than the second opening and the second opening is located nearer a top of the laminated window pane assembly than the first opening to facilitate thermal venting of the cavity 140 between the respective weather window structure 402, . . . , X and the adjacent security window assembly 100. Securing a plurality of security window assemblies 100 over the window openings defined by the building and to the structure of the building, provides a robust secure building envelope.

Therefore, one embodiment of the present invention includes a window support assembly having a window support frame that is constructed to be disposed about at least a portion of perimeter of an impact resistant transparent window assembly. The window support frame includes a support portion that extends across at least a portion of a thickness of the impact resistant transparent window assembly and a flange that extends radially inboard from the support portion to overlie a portion of a radial edge of the impact resistant transparent window assembly. A first opening and a second opening are formed through the support portion of the window support frame and each provide a respective passage through the window support frame at respective locations that are radially outboard of a footprint of the impact resistant transparent window assembly and wherein the first opening and the second opening are disposed about the impact resistant transparent window assembly and vertically offset from one another.

Another embodiment of the invention that includes various features, aspects, and objects that are useable or combinable with the above embodiments includes a security window assembly having a frame that is constructed to extend along at least a portion of an opening defined by a building structure. The frame includes a riser that is oriented to be disposed in a plane of a security window and located radially outboard of the security window. A reinforcement flange extends along a portion of at least one side of the security window and a mounting flange extends in a lateral direction from the riser and is constructed to secure the frame to the building structure. A first opening is formed through the riser and defines a passage that fluidly connects opposing sides of the security window at a location radially outboard of a perimeter of the security window and a second opening is formed through the riser that defines another passage that fluidly connects opposing sides of the security window at a location radially outboard of the perimeter of the security window and which is vertically offset from the passage defined by the first opening.

A further embodiment of the invention that is usable or combinable with one or more of the features, aspects, or objects of the above embodiments includes a method of forming a security window assembly. A laminated window pane assembly is provided that is shaped to overlie a building window opening. A frame assembly that is constructed to cooperate with the laminated window pane assembly is provided and is constructed to define a riser that extends between the laminated window pane assembly of the building window opening. A first opening and a second opening are formed through the riser such that each of the first opening and second opening extend to opposing sides of the laminated window pane assembly and the first opening is located nearer a bottom of the laminated window pane assembly than the second opening and the second opening is located nearer a top of the laminated window pane assembly than the first opening.

It should be understood that the above description, while indicating representative embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, which particularly point out and distinctly claim the subject matter regarding as the invention, and it is intended that the following claims cover all such additions, modifications, and rearrangements.

What is claimed is:

1. A window support assembly comprising:

a window support frame that is constructed to be disposed about at least a portion of a perimeter of an impact resistant transparent window assembly that overlies an adjacent weather resistant window, the window support frame includes a support portion that extends across at least a portion of a thickness of the impact resistant transparent window assembly, a flange that extends radially inboard from the support portion to overlie a portion of a radial edge of the impact resistant transparent window assembly, and a mount plate that is attached to the support portion of the window support frame and extends beyond the support portion in a crossing direction relative to a plane defined by the flange such that the impact resistant window assembly is maintained in a spaced relationship relative to the adjacent weather resistant window; and a first opening and a second opening that are each formed through the support portion of the window support frame and positioned radially inboard of the mount plate and which each provide a respective passage through the window support frame at respective locations that are radially outboard of a footprint of the impact resistant transparent window assembly, bounded by the impact resistant transparent window assembly, adjacent the support portion, and the mount plate, and wherein the first opening and the second opening are disposed about the impact resistant transparent window assembly, vertically offset from one another, remain unobstructed when the impact resistant transparent window assembly is secured to the window support frame, and are laterally offset from the adjacent weather resistant window.

2. The window support assembly of claim 1 further comprising additional openings formed through the support portion of the window support frame that are offset from the first opening and the second opening.

3. The window support assembly of claim 2 wherein the additional openings are no nearer than 4 inches from a respective end of an adjacent one of the first opening and second opening.

4. The window support assembly of claim 1 wherein the support portion of the window support frame has a rectilinear cross-sectional shape.

5. The window support assembly of claim 1 further comprising at least one support post secured to the mount plate and configured to traverse a window jamb and cooperate with a fastener for securing the window support assembly to a building structural feature that defines at least a portion of a shape of a window opening.

6. The window support assembly of claim 5 wherein the at least one support post is aligned with a respective one of the first opening and the second opening formed through the support portion of the window support frame.

7. The window support assembly of claim 5 wherein the at least one support post is further defined as a plurality of support posts that are dispersed about at least a bottom portion of the window opening.

8. A security window assembly comprising:

a frame constructed to extend along at least a portion of an opening defined by a building structure and having a weather resistant window disposed in the opening, the frame having a riser that is oriented to be disposed in a plane of a security window and located radially outboard of the security window and offset from the weather resistant window such that the security window overlies the weather resistant window, a reinforcement flange that extends along a portion of at least one side of the security window, and a mounting flange that extends in a lateral direction from the riser and is constructed to secure the frame to the building structure at a location laterally outboard of the weather resistant window;

a first opening formed through the riser that defines an unobstructed passage that fluidly connects opposing sides of the security window at a location radially outboard of a perimeter of the security window; and a second opening formed through the riser that defines another unobstructed passage that fluidly connects opposing sides of the security window at a location radially outboard of the perimeter of the security window and which is vertically offset from the passage defined by the first opening and such that the first opening and the second opening are each circumferentially bounded by the mounting flange, respective adjacent ends of the riser, and an edge of the security window when the mounting flange is secured to the frame of the building structure and vent a space between the security window and the weather resistant window.

9. The security window assembly of claim 8 further comprising a cut out formed through the reinforcement flange and that is aligned with a respective one of the first opening and the second opening formed in the riser.

10. The security window assembly of claim 8 further comprising a plurality of first openings and a plurality of second openings that are offset from one another about the perimeter of the security window.

11. The security window assembly of claim 10 wherein each of the plurality of first openings and each of the plurality of second openings are at least 3 inches from an adjacent respective one of the plurality of first openings and the plurality of second openings.

12. The security window assembly of claim 11 wherein each of the plurality of first openings and each of the plurality of second openings are no greater than 10 inches from an adjacent respective one of the plurality of first openings and the plurality of second openings.

13. The security window assembly of claim 11 wherein the plurality of first openings and the plurality of second openings account for approximately 20% of a linear distance of the frame.

14. The security window assembly of claim 8 further comprising a security window having a laminate construction and that extends continuously across an opening that is bounded by the frame.

15. The security window assembly of claim 8 further comprising at least one support post that extends between the mounting flange and the building structure and that is aligned with a respective one of the first opening and the second opening.

16. The security window assembly of claim 15 wherein the building structure is further defined as one of a building sill, a header structure, or a jamb structure.

17. A method of forming a security window assembly, the method comprising:

providing a laminated window pane assembly shaped to overlie a building window opening and a weather resistant window mounted in the building window opening;

providing a frame assembly that is constructed to cooperate with the laminated window pane assembly and is constructed to define each of a riser that extends between the laminated window pane assembly of the building window opening, a reinforcement flange that extends from the riser in a direction toward the laminated window pane, and a mounting flange that extends from the riser in a crossing direction relative to the reinforcement flange;

forming a first opening and a second opening through the riser such that each of the first opening and second opening are unobstructed and bounded by adjacent portions of the laminated window pane, the riser, and the mounting flange and extend to opposing sides of the laminated window pane assembly and the first opening is located nearer a bottom of the laminated window pane assembly that the second opening and the second opening is located nearer a top of the laminated window pane assembly than the first opening; and extending at least one support post through the mounting flange and into engagement with a structure surrounding the building window opening at a location aligned with a respective one of the first opening and the second opening such that the laminated window pane overlies the weather resistant window and the first opening and the second opening vent a space between the laminated window pane and the weather resistant window.

18. The method of claim 17 wherein forming the first opening and the second opening is further defined as forming a plurality of first openings and a plurality of second openings that are distributed about a circumference of the laminated window pane assembly and each of the plurality of first opening and second openings are unobstructed.

19. The method of claim 18 wherein each of the plurality of first openings and each of the plurality of second openings are between 2 inches and 10 inches away from a nearest adjacent respective one of the plurality of first openings and the plurality of second openings.

* * * * *